United States Patent
Tanabe

[15] 3,681,522

[45] Aug. 1, 1972

[54] SYSTEM FOR MINIMIZING FLUCTUATIONS OF TELEVISION SIGNAL

[72] Inventor: Kenzo Tanabe, Osaka, Japan

[73] Assignee: Matsushita Electric Industrial Co., Ltd., Kadoma, Osaka, Japan

[22] Filed: June 5, 1970

[21] Appl. No.: 43,716

[30] Foreign Application Priority Data

June 10, 1969 Japan..........................44/45905
June 10, 1969 Japan..........................44/45906
Aug. 19, 1969 Japan..........................44/66717

[52] U.S. Cl........................178/6.6 TC, 178/69.5 DC
[51] Int. Cl.............................H04n 5/08, H04n 5/78
[58] Field of Search.......178/6.6 A, 6.6 TC, 69.5 DC

[56] References Cited

UNITED STATES PATENTS 3,091,660 5/1963 Houghton..................178/6.6 A
3,029,306 4/1962 Dolby........................178/6.6 A
2,971,047 2/1961 Kennedy...............178/69.5 DC

*Primary Examiner*—Howard W. Britton
*Attorney*—Wenderoth, Lind & Ponack

[57] ABSTRACT

An arrangement for minimizing the picture quality reducing fluctuations in television signals reproduced from a video tape recorder and supplied to a television receiver.

Television signals reproduced from the video tape recorder are applied to signal switching means and signal separator means, respectively.

The signal switching means remove only horizontal synchronizing pulses from the reproduced television signals and result in modified picture signals. The signal separator means take out horizontal synchronizing pulses selectively, which are applied to a time base processor means in which the timing of the horizontal synchronizing pulses is modulated so as to compensate for the phase shift caused by the automatic frequency control circuit in a monitor television receiver.

The modified picture signals and processed horizontal synchronizing pulses are added together by mixer means, and then are supplied to a monitor television receiver.

As a result, the picture quality reducing fluctuations of the reproduced television signals are minimized.

5 Claims, 23 Drawing Figures

INVENTOR
KENZO TANABE

BY Wenderoth, Lind & Ponack
ATTORNEYS

INVENTOR
KENZO TANABE

BY Wenderoth, Lind & Ponack
ATTORNEYS

INVENTOR
KENZO TANABE

BY Wenderoth, Lind & Ponack
ATTORNEYS

INVENTOR
KENZO TANABE

BY Wenderoth, Lind & Ponack
ATTORNEYS

INVENTOR
KENZO TANABE

BY Wenderoth, Lind & Ponack
ATTORNEYS

INVENTOR
KENZO TANABE

BY Wenderoth, Lind & Ponack
ATTORNEYS

INVENTOR
KENZO TANABE

BY Wenderoth, Lind & Ponack
ATTORNEYS

INVENTOR
KENZO TANABE

BY Wenderoth, Lind & Ponack
ATTORNEYS

SYSTEM FOR MINIMIZING FLUCTUATIONS OF TELEVISION SIGNAL

This invention relates to a system for minimizing the picture quality reducing fluctuations in television signals reproduced form a video tape recorder (hereinafter abbreviated as V.T.R.), which fluctuations are caused by timing errors.

It has already been proposed to correct the timing errors by changing the signal delay time. For this purpose, the television signals reproduced from a V.T.R. are applied to an electrically variable delay line, the delay time of which is controlled by means of the timing error signal derived by comparison of the timing of the reproduced synchronizing signals and standard synchronizing signals.

The delay time of the delay line is changed by influencing the values of the capacitive or inductive elements by means of the timing error signal.

In general, the capacitive elements of the delay line are used as controllable elements and to this end capacitors, the capacitance of which is voltage variable, and which are known as varicaps or varactor diodes, are used.

An arrangement for timing error correction carried out in this manner only works satisfactorily where timing errors are less than a few microseconds. Because the range of variations of the delay time is small in relation to the total delay of the line, the mean delay time of the variable delay line must be substantially greater than the maximum value of the timing errors to be corrected.

However, television signals reproduced from a simplified V.T.R., for example, one for home use, generally contain a relatively large timing error therein, and therefore said arrangement for timing error correction does not work satisfactorily in this case.

There is another well-known method for decreasing the picture quality reducing fluctuations caused by timing errors in the television signals reproduced from a V.T.R., namely the method of changing the characteristics of the automatic frequency control (hereinafter abbreviated as A.F.C.) circuit in the horizontal deflection circuit of a monitor television receiver.

For this purpose, the low pass filter transfer function or timing error transfer gain of the A.F.C. circuit is changed so as to increase the open loop timing error transfer gain thereof in the frequency range where the timing error components exist.

There is still another well known method for decreasing the picture quality reducing fluctuations caused by timing error included in the television signals reproduced from a V.T.R., i.e., by modifying the horizontal deflection circuit in a monitor television receiver so as to ensure the proper beginning of each horizontal traced line. For this purpose, the horizontal deflection current, which has the wave shape of saw tooth, in the horizontal deflection coil is directly produced by input horizontal synchronizing pulses without using the conventional A.F.C. circuit. This is accomplished by triggering directly a voltage controlled oscillator in the A.F.C. circuit of the monitor television receiver by using the input horizontal synchronizing pulses.

These methods are very effective where a great number of timing errors exist in the low frequency range, and can be used for decreasing the picture quality reducing fluctuations.

But modification of the A.F.C. circuit in a monitor television receiver in the manner described above is complicated. Therefore, it is desirable to reproduce the television signals without modifying the A.F.C. circuit.

It is therefore an object of the present invention to provide a new system for decreasing the picture quality reducing fluctuations caused in television signals reproduced from a V.T.R., which fluctuations are caused by timing errors, which system will not be subject to the aforementioned limitations and complications, while getting the same effect, without modifying the A.F.C. circuit in a monitor television receiver, as that accomplished by modifying the A.F.C. circuit so as to ensure the proper beginning of each horizontal traced line.

In order to overcome the aforementioned limitations and complications, the present invention provides time base processor means which include a time base modulator.

The time base modulator modulates the reproduced horizontal synchronizing signal timing by a timing error signal detected from the reproduced television signals so as to compensate the timing error transfer function of the A.F.C. circuit in a monitor television receiver.

According to the invention, when compensating the timing error transfer function of the A.F.C. circuit in a monitor television receiver, the timing of the horizontal deflection current in the horizontal deflection coil is caused to be the same as the timing of the reproduced horizontal synchronizing pulses, and so it is equivalent to modifying the horizontal deflection circuit of the monitor television receiver so as to ensure the proper beginning of each horizontal traced line.

According to the present invention, horizontal synchronizing signals are separated from the reproduced television signals and processed by the time base processor means described above to develop processed horizontal synchronizing signals during the horizontal blanking portion of the signals.

On the other hand, modified picture signals which have no horizontal synchronizing signals are developed by switching the reproduced television signals to a constant level during the horizontal blanking portions of the signals.

These two newly developed signals, that is, the processed horizontal synchronizing signals and modified picture signals, are added and result in processed television signals which are applied to the video amplifier and synchronizing pulse separator in a monitor television receiver.

A further object of this invention is to minimize the picture quality reducing fluctuations in the picture signal due to timing errors by means of a system comprising a simple electric circuit.

The invention and other objects and advantages thereof will become apparent from the following description when read in conjunction with the accompanying drawings.

In the drawings, wherein like reference characters refer to the same parts in the several figures.

Means for processing vertical synchronizing signals are omitted in all the figures, because it has no influence on the A.F.C. circuit in the horizontal deflection circuit of a monitor television receiver and such a signal can be treated as one of the picture signals.

Before explaining the function of the system according to the present invention, it is important to understand the process of displaying the reproduced television signals as pictures on the cathode ray tube screen of a monitor television receiver which is used in conjunction with the system embodying the present invention.

Figure 1:
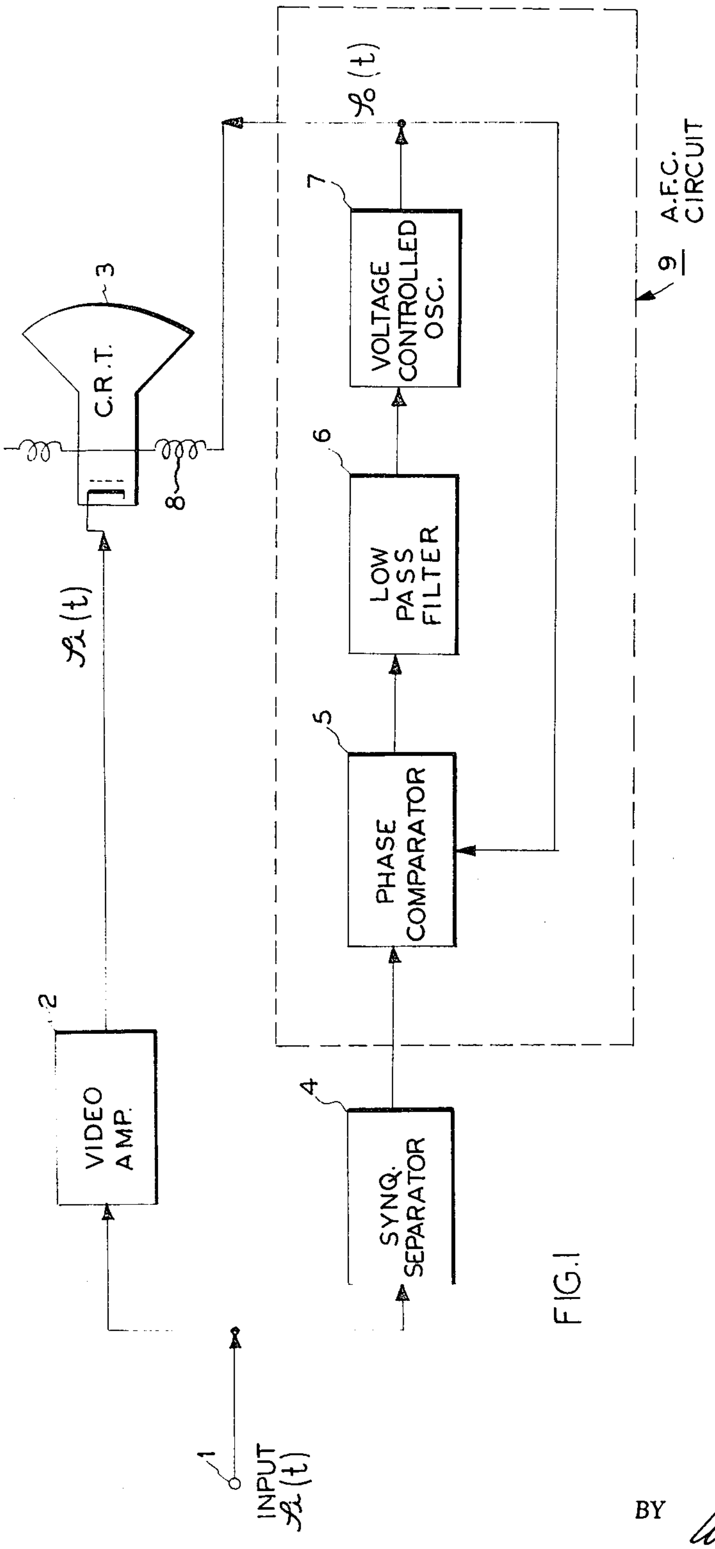
FIG. 1 is a block diagram of a circuit for displaying reproduced television signals as pictures on the cathode ray tube screen of a monitor television receiver which is used with the system embodying the present invention.

Referring to FIG. 1, television signals, which have timing errors $\zeta_i(t)$, reproduced from a V.T.R. are supplied to an input terminal 1, which is connected to a video amplifier 2 which amplifies the picture signals, which amplifier is in turn connected to a cathode ray tube 3 to appropriately drive the tube 3.

The television signal input is also connected to a synchronizing signal separator 4 which separates vertical and horizontal synchronizing signals from the television signals.

This output of the video amplifier 2 is connected to the cathode or grid of a cathode ray tube 3 and the signals form amplifier 2, which have the same timing errors $\zeta_i(t)$ as the input signals, modulate the density of the electron beam emitted from the cathode of tube 3 to display the picture brightness.

The output of synchronizing signal separator is connected to a phase comparator 5, low pass filter 6, and voltage controlled oscillator 7 connected in a closed loop circuit to form a well known A.F.C. circuit 9. This A.F.C. circuit 9 and synchronizing signal separator 4 compose a horizontal synchronizing signal processor means.

Horizontal synchronizing signals, which also have the same timing errors $\zeta_i(t)$ derived from said synchronizing signal separator 4 are supplied to the phase comparator 5 which compares the timing of the horizontal synchronizing signals with the timing of the output signals of the voltage controlled oscillator 7, and the phase comparator 5 develops timing error signals which are proportional to the timing difference between these two signals.

This timing error signal is supplied to the voltage controlled oscillator 7, the oscillation frequency of which is controlled by the applied voltage, through a low pass filter 6 which cuts off the high frequency component of the timing error signal.

The output signals of the horizontal synchronizing signal process or means having timing errors of $\zeta_o(t)$ instead of $\zeta_i(t)$. The output of said voltage controlled oscillator 7 is connected to a horizontal deflection coil 8 which is combined with the cathode ray tube 3 through a horizontal deflection signal amplifier which is not illustrated in FIG. 1 because it does not influence the timing error transfer characteristics of receiver. Horizontal synchronizing signal processor means in a monitor television receiver. These output signals drive coil 8.

The picture signals from said video amplifier 2 and the horizontal deflection signals from said horizontal synchronizing signal processor means are combined by said cathode ray tube 3 and result in a picture on the screen thereof.

The resultant picture quality reducing fluctuations are defined as the timing difference of $(\zeta_i(t)-\zeta_o(t))$.

To explain said timing difference it is important to investigate the timing error transfer function of said A.F.C. circuit 9 in a monitor television receiver.

Figure 2:
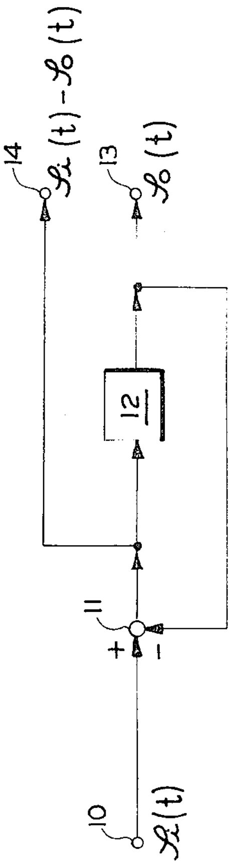
FIG. 2 is a simplified block diagram of an A.F.C. circuit.

This timing error transfer function is obtained by using the simplified block diagram of the A.F.C. circuit illustrated in FIG. 2. An input terminal 10 is connected to a summing means 11, which in turn is connected to a timing error transfer means 12, and also to output terminal 14. Timing error transfer means 12 is connected to an output terminal 13 and through a feedback loop to the summing means 11 so that it is in a closed loop circuit therewith.

A signal having timing errors of $\zeta_i(t)$ is supplied to an input terminal 10 and thence to the summing means 11, which in practice is the phase comparator 5.

The summing means 11 produces a difference signal between said timing errors of $\zeta_i(t)$ from said input terminal 10 and timing errors of $\zeta_o(t)$ from the timing error transfer means 12, which, in practice, is composed of said low pass filter 6 and said voltage controlled oscillator 7. Said difference signal is applied to said timing error transfer means 12, which is in the closed loop circuit with said summing means 11.

Thus, the circuit functions as an A.F.C. circuit.

Of the two output terminals 13 and 14 in FIG. 2, the terminal 13 is for the horizontal deflection means, i.e. the coil 8 of FIG. 1, and the other terminal 14 is used as a timing error detecting terminal.

Now considering the timing error transfer function of said timing error transfer means 12 as F(s), which is considered as an open loop transfer gain of the A.F.C. circuit, the timing error transfer gains from input terminal 10 to output terminal 13 and from input terminal 10 to output terminal 14 are expressed in equations 1 and 2, respectively.

$$\frac{\zeta_0(s)}{\zeta_i(s)}=\frac{F(s)}{1+F(s)} \quad (1)$$

$$\frac{\zeta_i(s)-\zeta_0(s)}{\zeta_i(s)}=\frac{1}{1+F(s)} \quad (2)$$

where $\zeta_i(s)$ and $\zeta_o(s)$ are Laplace Transformations of $\zeta_i(t)$ and $\zeta_o(t)$, respectively.

Equation (1) is the timing error transfer function of the A.F.C. circuit 9 in a monitor television receiver.

Equation (2) shows that the output signal from the phase comparator 5 is proportional to the input signal timing errors.

From Equations (1) and (2), it can be concluded that an A.F.C. circuit has a timing error transfer function which is a function of the open loop transfer gain thereof, and the A.F.C. circuit can be used not only for stabilizing the input horizontal synchronizing signals, but also for detecting the timing errors therein.

Figure 3:
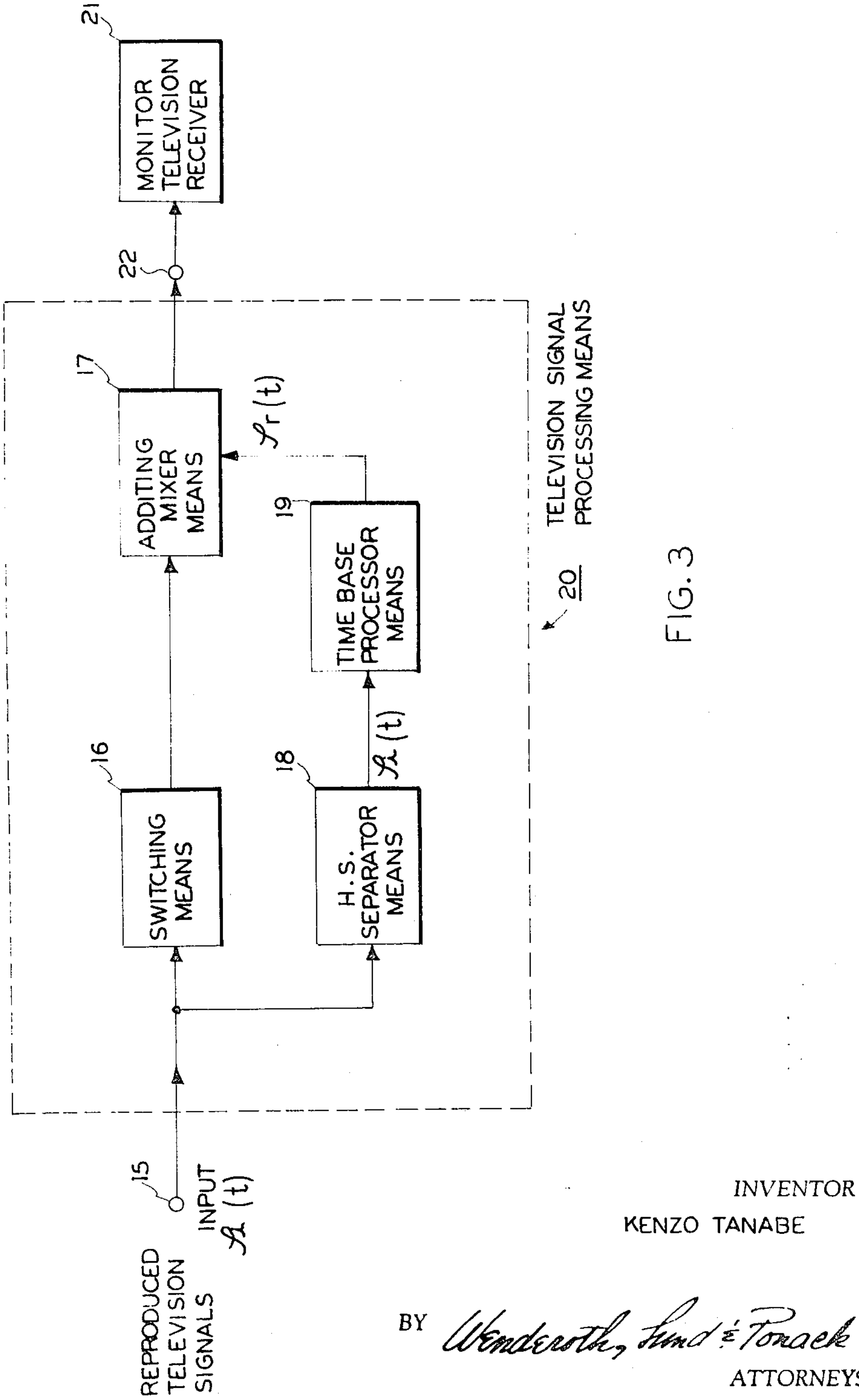
FIG. 3 is a block diagram of a fundamental form of a television signal processing means used in conjunction with a monitor television receiver according to the present invention.

The fundamental concept of the present invention will be understood more clearly by reference to FIG. 3.

in FIG. 3 is shown diagrammatically a system for reproducing television signals according to the present invention. The system 20 is comprised of an input terminal 15 connected to a signal switching means 16, which in turn is connected to a signal adding mixer means 17. The input terminal is also connected to a horizontal synchronizing signal separator means 18, which in turn is connected to a time base processor means 19. The time base processor means 19 is also connected to the signal adding mixer.

Television signals which have timing errors of $\zeta_i(t)$, reproduced from a V.T.R., are supplied to the input terminal 15 and fed to the signal switching means 16 which develops modified picture signals by switching said reproduced television signals to a constant level during the portion of horizontal blanking.

The television signals are also supplied to the horizontal synchcronizing signal separator means 18 which separates the horizontal synchronizing signals from said reproduced television signals.

The separated horizontal synchronizing signals are supplied to the time base processor means 19 which develops new processed horizontal synchronizing signals having timing errors of $\zeta_r(t)$, during the horizontal blanking portions of said reproduced television signals.

The newly developed horizontal synchronizing signals and said modified picture signals are both supplied to the signal adding mixer means 17 which adds these two newly developed signals so that processed television signals are obtained at the output terminal 22.

Said processed television signals from said signal adding mixer means 17 are supplied from said output terminal 22 to a monitor television receiver, the function of which is already described above in conjunction with FIGS. 1 and 2.

In the system shown in FIG. 3 there is provided the time base processor means 19 which have a timing error transfer function expressed in Equation (3):

$$\frac{\zeta_r(s)}{\zeta_i(s)}=\frac{1+F(s)}{F(s)} \qquad (3)$$

where $\zeta_i(s)$, $\zeta_r(s)$ are the Laplace Transformations of timing errors of $\zeta_i(t)$, $\zeta_r(t)$, respectively.

Equation (3) is a reciprocal of said timing error transfer function of the A.F.C. circuit in said monitor television receiver 21, as set forth in Equation(1). Consequently, said television signal processing system 20 compensates for the characteristics of the A.F.C. circuit in a monitor television receiver 21.

Since the most important means in the system according to the present invention is said time base processor means 19 in FIG. 3, some concrete examples of said base processor means will be described in conjunction with FIGS. 4–9.

Figure 4:
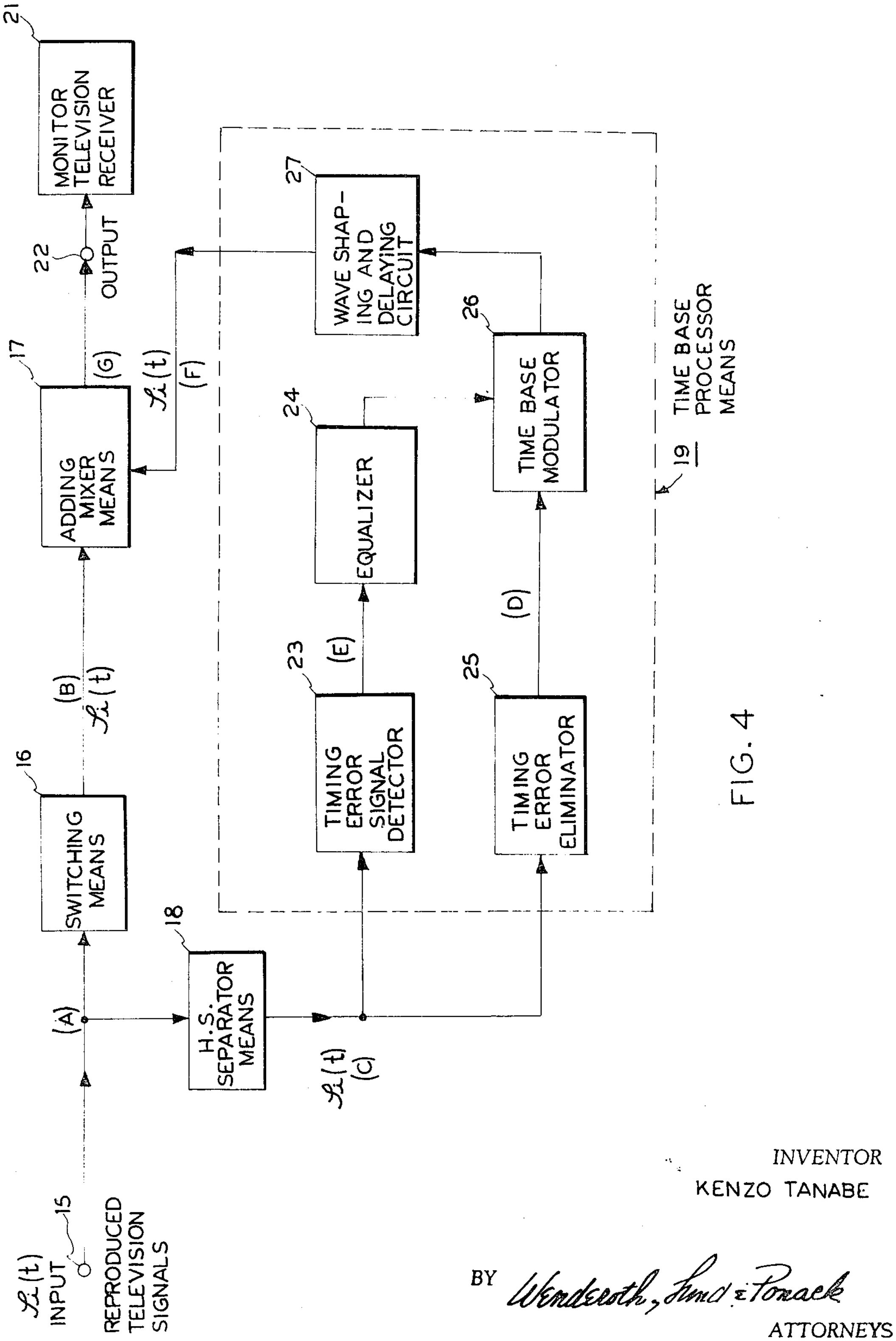
FIG. 4 is a block diagram of a television signal processing means as shown in FIG. 3 employing one form of time base processor means.
Figure 5A:
FIGS. 5A – 5G are graphs illustrating the time relation of various waveforms occurring in the circuit shown in FIG. 4.

Referring to FIGS. 4 and 5A–5G, television signals which are reproduced from a V.T.R. and which have timing errors of $\zeta_i(t)$ are assumed to have a waveform shown in FIG. 5A.

Said television signals are introduced to the input terminal 15 of the system of the present invention and are applied to both the signal switching means 16 and the horizontal synchronizing signal separator means 18.

Figure 5B:

The signal switching means 16, which in practice can be a well known non-linear amplifier, switches the television signals of the wave form A to a fixed level during the horizontal blanking portion and produces modified picture signals having a waveform shown in FIG. 5B, in which the horizontal synchronizing signals have been removed from the television signals having the waveform of FIG. 5A.

Figure 5C:

The horizontal synchronizing signal separator means 18, which in practice can be a well known non-linear amplifier, separates the horizontal synchronizing signals from the input television signals and the resultant pulses having a waveform shown in FIG. 5C are applied to the time base processor means 19. This means comprises a timing error signal detector 23 connected to an equalizer 24, a timing error eliminator 25, a time base modulator 26 to which both the equalizer 24 and the timing error eliminator 25 are connected, and a wave shaping and delaying circuit 27 to which the time base modulator 26 is connected.

Figure 5D:
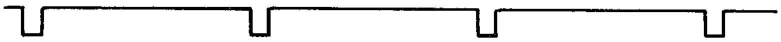
Figure 5E:
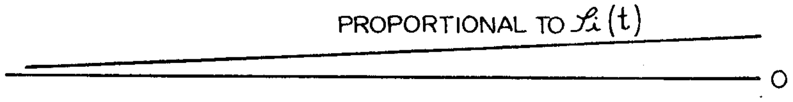
Figure 5F:
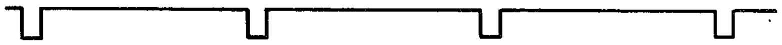

The time base processor means 19 develops processed horizontal synchronizing signals having a waveform shown in FIG. 5F during horizontal blanking.

The processed horizontal synchronizing signals have timing errors of $\zeta_r(t)$ instead of $\zeta_i(t)$.

Figure 5G:

The newly developed horizontal synchronizing signals having a waveform shown in FIG. 5F and the modified picture signals having a waveform shown in FIG. 5B are added by signal adding mixer means 17 and the resultant signal having a waveform shown in FIG. 5G is applied to the monitor television receiver 21 through an output terminal 22.

As a result, the processed television signals having a waveform shown in FIG. 5G consist of picture signals having timing errors of $\zeta_i(t)$ and horizontal synchronizing signals having a timing error of $\zeta_r(t)$.

A detailed description of the function of the time base processor means 19 is as follows.

The separated horizontal synchronizing signals having a waveform shown in FIG. 5C are applied to both the timing error signal detector 23 and the timing error eliminator 25.

The timing error detector 23, which in practice can be some well known combination of a resonant circuit which acts as a frequency variation detector, develops a timing error signal having a waveform shown in FIG. 5E in which timing errors of $\zeta_i(t)$ are detected.

This timing error signal is applied to said time base modulator 26 through said equalizer 24 and modulates the timing of the signals having a waveform shown in FIG. 5D, obtained from said timing error eliminator 25 which develops signals having no timing errors therein.

Said timing error eliminator 25 can in practice be, for example,a combination of a resonant circuit, a Schmitt trigger circuit, and a monostable multivibrator.

Also said time base modulator 26 can in practice be, for example, by a monostable multivibrator triggered by the signals from the timing error eliminator 25 having a waveform shown in FIG. 5D, the delay time of which is changed by the applied signal from said equalizer 24.

Said time base modulated signals are applied to the wave shaping and delaying circuits 27 which develop processed horizontal synchronizing signals having a wave form shown in FIG. 5F during horizontal blanking.

These processed horizontal synchronizing signals have timing errors of $\zeta_r(t)$ and are applied to the signal adding mixer means 17 as already described above.

Said wave shaping and delaying circuit 27 can in practice be, for example, a combination of some monostable multivibrators.

If the system of FIG. 4 according to the present invention has sufficient linearity where the timing errors exist, the timing errors of the newly developed horizontal synchronizing signals having a waveform shown in FIG. 5F can be expressed by Equation (4):

$$\zeta_r(s) = k_1 \cdot k_2 \cdot A(s) \cdot \zeta_i(s) \qquad (4)$$

where:

$k_1$ : sensitivity of said timing error signal detector 23.

$k_2$ : sensitivity of said time base modulator 26.

$A(s)$ : transfer function of said equalizer 24.

$\zeta_i(s)$ ,$\zeta_r(s)$ : Laplace Transformation of timing errors of $\zeta_i(t)$, $\zeta_r(t)$, respectively.

As already mentioned above, said time base processor means 19 must satisfy the Equation (3), and therefore the relationship of $k_1$, $k_2$, and $A(s)$ in Equation (4) are defined as in Equation (5).

$$k_1 \cdot k_2 \cdot A(s) = \frac{1+F(s)}{F(s)} \qquad (5)$$

Investigating Equation (5), it can be concluded that it is important to select the proper sensitivity of said timing error signal detector 23, the sensitivity of said time base modulator 26 and the transfer function of said equalizer 24, in relation to the timing error transfer function of the A.F.C. circuit in a monitor television receiver, in order for the system in FIG. 4 according to the present invention to work satisfactorily.

Usually the open loop timing error transfer function of the A.F.C. circuit in a monitor television receiver is greater than unity where the frequency component of the timing errors is sufficiently low. However, said equalizer 24 can in practice be a fixed attenuator or a D.C. amplifier.

There are other effective means for processing the reproduced horizontal synchronizing signals which use the A.F.C. circuit as a timing error signal detector.

Figure 6:
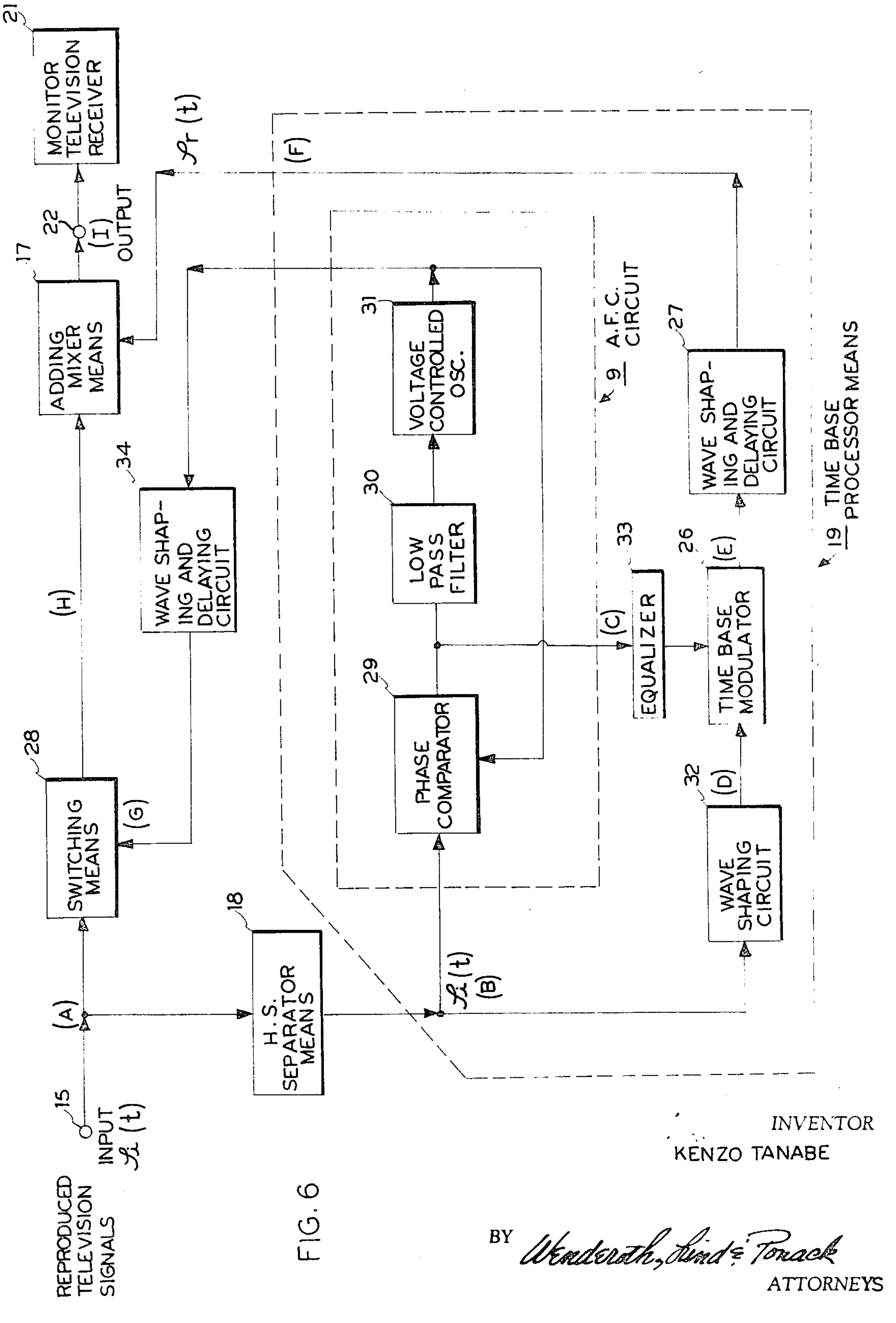
FIGS. 6, 7 and 8 are block diagrams of a television signal processing means as shown in FIG. 3 employing other forms of the time base processor means.

Referring to FIGS. 6 and 9, there is shown an embodiment of the system accorcing to the invention which is similar to that of FIG. 3,except that a switching means 28 is used in place of the switching means 16 and the time base processor means 19 is modified. It comprises an A.F.C. circuit 9 like that of FIG. 1 with a phase comparator 29, a low pass filter 30 and a voltage controlled oscillator 31. A wave shaping circuit 32, a time base modulator 26, and wave shaping and delaying circuit 27 are connected in series, and an equalizer 33 is connected between the junction between the phase comparator 29 and the low pass filter 30 and the time base modulator 26.

Figure 9A:
FIGS. 9A – 9I are graphs illustrating the time relation of various wave forms occurring in the circuits shown in FIGS. 6, 7, and 8.

Television signals, which have timing errors of $\zeta_i(t)$, reproduced from a V.T.R. are assumed to have a waveform as shown in FIG. 9A.

Said television signals are introduced to the input terminal 15 and are applied both to the signal switching means 28 and the horizontal synchronizing signal separator means 18.

Figure 9B:
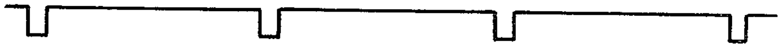
Figure 9C:
Figure 9D:
Figure 9E:
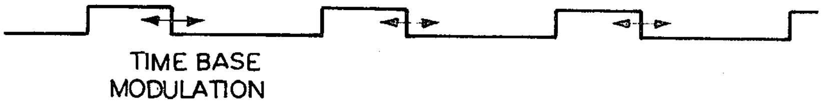
Figure 9F:
Figure 9G:
Figure 9H:

The signal switching means 28 receive other signals, that is, pulses having a waveform as shown in FIG. 9G, and switches the television signals having the waveform as shown in FIG. 9A to a fixed level during horizontal blanking to produce modified picture signals having a waveform as shown in FIG. 9H, in which the horizontal synchronizing signals are removed from the television signals, as shown in FIG. 9A.

The signal switching means 28 in practice can be a switching circuit which holds the input signal to a fixed level during the application of the pulses having a waveform as shown in FIG. 9G.

The horizontal synchronizing signal separator means 18, which can be a well known non-linear amplifier, separate the horizontal synchronizing signals from the input television signals and the resultant pulses having a waveform as shown in FIG. 9B are applied to time base processor means 19.

The time base processor means 19 develops processed horizontal synchronizing signals having a waveform as shown in FIG. 9F during horizontal blanking.

The processed horizontal synchronizing signals have timing errors of $\zeta_r(t)$ instead of $\zeta_i(t)$. The newly developed horizontal synchronizing signals having a waveform as shown in FIG. 9F and the modified picture signals having a wave form as shown in FIG. 9H are added by signal adding mixer means 17 and the resultant signal having a waveform as shown in FIG. 9I is supplied to a monitor television receiver 21 through the output terminal 22.

Figure 9I:

As a result, the processed television signals having a waveform shown in FIG. 9I consist of picture signals having timing errors of $\zeta_i(t)$ and horizontal synchronizing signals having a timing error of $\zeta_r(t)$.

A detailed description of the function of the time base processor means 19 is as follows.

The separated horizontal synchronizing signals having a waveform as shown in FIG. 9B are applied to both the wave shaping circuit 32 and the A.F.C. circuit 9. The wave shaping circuit 32 can in practice be, for example, a monostable multivibrator triggered by input signals, and produces signals having a waveform as shown in FIG. 9D. The wave shaping circuit 32 is used as a buffer between said horizontal synchronizing signal separator means 18 and said time base modulator 26, and can be sometimes omitted.

On the other hand, the A.F.C. circuit 9 operates in the same manner as the A.F.C. circuit described above in conjunction with FIGS. 1 and 2, and develops two signals, one of which is obtained from said voltage controlled oscillator 31, and the other of which is obtained from said phase comparator 29.

The timing error signal having a waveform as shown in FIG. 9C, obtained from said phase comparator 29, is supplied to said time base modulator 26 through said equalizer 33 and modulates the timing of the signal obtained from said wave shaping circuit 32.

The time base modulated signals having a waveform shown in FIG. 9E are supplied to said wave shaping and delaying circuit 27 which develops processed horizontal synchronizing signals having a waveform as shown in FIG. 9F.

The time base modulator 26 and wave shaping and delaying circuit 27 operate and in practice are constituted the same as those described above in conjunction with FIG. 4.

The processed horizontal synchronizing signals have timing errors of $\zeta_r(t)$ and are supplied to the signal adding mixer means 17 as already described above.

The signals obtained from said voltage controlled oscillator are supplied to a wave shaping and delaying circuit 34 which produces signals having a waveform as shown in FIG. 9G to drive said signal switching means 28, said wave shaping and delaying circuit 34 in practice being, for example, a combination of monostable multivibrators.

If the system as shown in FIG. 6 according to the present invention has sufficient linearity where the timing errors exist, the timing errors of the newly developed horizontal synchronizing signals having a waveform shown in FIG. 9F can be expressed by Equation (6):

$$\zeta_r(s) = \left(1 + \frac{k_3 \cdot k_4 \cdot B(s)}{1+H(s)}\right) \zeta_i(s) \qquad (6)$$

where $k_3$ : sensitivity of said phase comparator 39.

$k_4$ : sensitivity of said time base modulator 26.

$B(s)$ : transfer function of said equalizer 33.

$H(s)$ : open loop timing error transfer function of said A.F.C. circuit 9 in FIG. 6.

$\zeta_i(s),\zeta_r(s)$ : Laplace Transformation of timing errors of $\zeta_i(t)$, $\zeta_r(t)$, respectively.

As already mentioned above, said time base processor means 19 must satisfy the Equation (3), and therefor the relationship of $K_3$, $K_4$, $B(s)$, and $H(s)$ in equation (6) can be defined as in Equation (7):

$$k_3 \cdot k_4 \cdot B(s) = \frac{1+H(s)}{F(s)} \qquad (7)$$

Investigating Equation (7), it can be concluded that it is important to select properly the sensitivity of said phase comparator 29, the sensitivity of said time base modulator 26, the transfer function of said equalizer 33 and the open loop timing error transfer function of the A.F.C. circuit in the monitor television receiver, in order that the system shown in FIG. 6 will work satisfactorily.

If in the Equation (7), $H(s)$ is designed with the characteristics thereof in a proportional relation to $F(s)$ and both $H(s)$ and $F(s)$ are greater than unity where the frequency component of the timing errors exist, said equalizer 33 can in practice be a fixed attenuator or a D.C. amplifier.

There are still other effective means for processing the reproduced horizontal synchronizing signals while utilizing the A.F.C. circuit for detecting the timing error signal and for deriving stable horizontal synchronizing signals.

Figure 7:
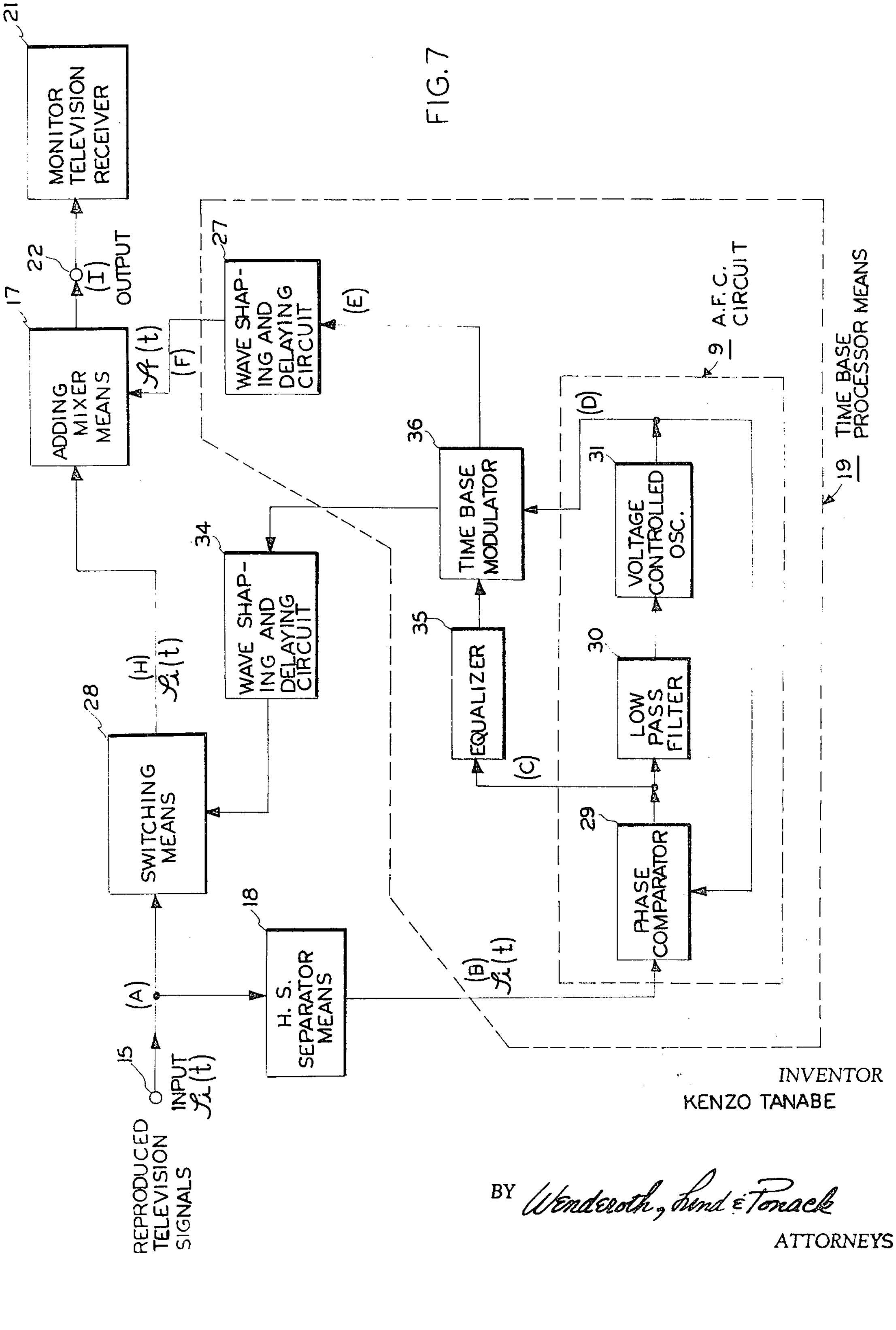

Referring to FIGS. 7 and 9, there is shown a system according to the invention which is almost the same as that of FIG. 6 except that the wave shaping circuit 32 has been omitted and the phase comparator 29 of the A.F.C. circuit is connected to an equalizer 35 which in turn is connected to the time base modulator 26. Also, the output of A.F.C. circuit 9 is supplied to time base modulator 26, and the output of time base modulator is connected to the wave shaping and delaying circuit 34 in addition to being supplied to wave shaping and delaying circuit 27. Television signals which have timing errors of $\zeta_i(t)$ reproduced from a V.T.R. are assumed to have a waveform as shown in FIG. 9A. Said television signals are introduced to the input terminal 15 and are supplied to both the signal switching means 28 and the horizontal synchronizing signals separator means 18.

The signal switching means 28 receive other signals, that is, the pulses having a waveform as shown in FIG. 9G, and switches the television signals having the waveform as shown in FIG. 9A to a fixed level during horizontal blanking, and produces modified picture signals having a waveform as shown in FIG. 9H, in which the horizontal synchronizing signals are removed from the television signals having the waveform as shown in FIG. 9A.

The signal switching means 28 can in practice be a switching circuit which holds the input signal at a fixed level during the application of the pulses having a waveform as shown in FIG. 9G.

The horizontal synchronizing signal separator means 18, which in practice can be well known non-linear amplifier, separates the horizontal synchronizing signals from the input television signals and the resultant pulses having a waveform as shown in FIG. 9B are supplied only to the phase comparator 29 of the A.F.C. circuit in the time base processor means 19.

The time base processor means 19 develops processed horizontal synchronizing signals having a waveform as shown in FIG. 9F during horizontal blanking. This processed horizontal synchronizing signals have a timing error of $\zeta_r(t)$ instead of $\zeta_i(t)$. The newly developed horizontal synchronizing signals having a waveform shown as in FIG. 9F and the modified picture signals having a waveform shown in FIG. 9H are added by signal adding mixer means 17 and the resultant signal having a waveform as shown in FIG. 9I is supplied to the monitor television receiver 21 from the output terminal 22.

As a result of this processed television signals having a waveform as shown in FIG. 9I consist of picture signals having timing errors of $\zeta_i(t)$ and horizontal synchronizing signals having timing errors of $\zeta_r(t)$.

A detailed description of the function of the time base processor means 19 is as follows.

The separated horizontal synchronizing signals having a wave form as shown in FIG. 9B are supplied to said A.F.C. circuit 9. This A.F.C. circuit 9 operates in the same manner as the A.F.C. circuit described above in conjunction with FIGS. 1 and 2, and develops two signals, one of which is obtained from said voltage controlled oscillator 31, and the other of which is obtained from said phase comparator 29.

The timing error signal having a wave form as shown in FIG. 9C, obtained from said phase comparator 29, is supplied to said time base modulator 26 through said equalizer 35 and modulates the timing of the signals having a waveform as shown in FIG. 9D obtained from said voltage controlled oscillator 31.

The time base modulated signals having the waveform as shown in FIG. 9E are supplied to said wave shaping and delaying circuit 27 which develops processed horizontal synchronizing signals having a waveform as shown in FIG. 9F.

The time base modulator 26 and the wave shaping and delaying circuit 27 operate and are constituted the same as those of FIG. 4.

The processed horizontal synchronizing signals have timing errors of $\zeta_r(t)$ and are supplied to the signal adding mixer means 17 as already described above.

The time base modulated signals having a waveform as shown in FIG. 9E are also supplied to said wave shaping and delaying circuit 34 which produces the signals having a waveform shown in FIG. 9G to drive said signal switching means 28.

Said wave shaping and delaying circuit 34 can be constituted, for example, by a combination of monostable multivibrators.

If the system of FIG. 7 has a sufficient linearity where the timing errors exist, the timing errors of the newly developed horizontal synchronizing signals having a waveform as shown in FIG. 9F can be expressed in Equation (8):

$$\zeta_r(s) = \frac{G(s) + k_5 \cdot k_6 \cdot C(s)}{1+G(s)} \zeta_i(s) \qquad (8)$$

where $k_5$ : sensitivity of said phase comparator 29.

$k_6$ : sensitivity of said time base modulator 26.

$C(s)$ : transfer function of said equalizer 35.

$G(s)$ : open loop timing error transfer function of said A.F.C. circuit 9 in FIG. 7.

$\zeta_i(s)$,$\zeta_r(s)$ : Laplace Transformation of timing errors of $\zeta_i(t)$, $\zeta_r(t)$, respectively.

As already mentioned above, said time base processor means 19 must satisfy Equation (3), and therefore the relationship among $k_5$, $k_6$, $C(s)$, and $G(s)$ in Equation 8 can be defined as in Equation (9):

$$k_5 \cdot k_6 \cdot C(s) \cdot F(s) = 1+F(s)+G(s) \qquad (9)$$

Investigating Equation (9) it can be concluded that it is important to select properly the sensitivity of said phase comparator 29, the sensitivity of said time base modulator 26, the transfer function of said equalizer 35 and the open loop timing error transfer function of said A.F.C. circuit 9, in relation to the open loop timing error transfer function of the A.F.C. circuit in a monitor television receiver, in order for the system of FIG. 7 to work satisfactorily.

If in Equation (9), $G(s)$ is designed with the characteristics thereof in proportional relation to $F(s)$ and both $G(s)$ and $F(s)$ are greater than unity where the frequency component of the timing errors exist, said equalizer 35 can be a fixed attenuator or a D.C. amplifier.

The embodiment of the present invention as shown in FIg. 7 has the advantage in comparision with the system shown in FIG. 6 that it stabilizes the reproduced horizontal synchronizing signals.

There are many modifications of the system according to the present invention utilizing the A.F.C. circuit for detecting the timing error signal.

Figure 8:
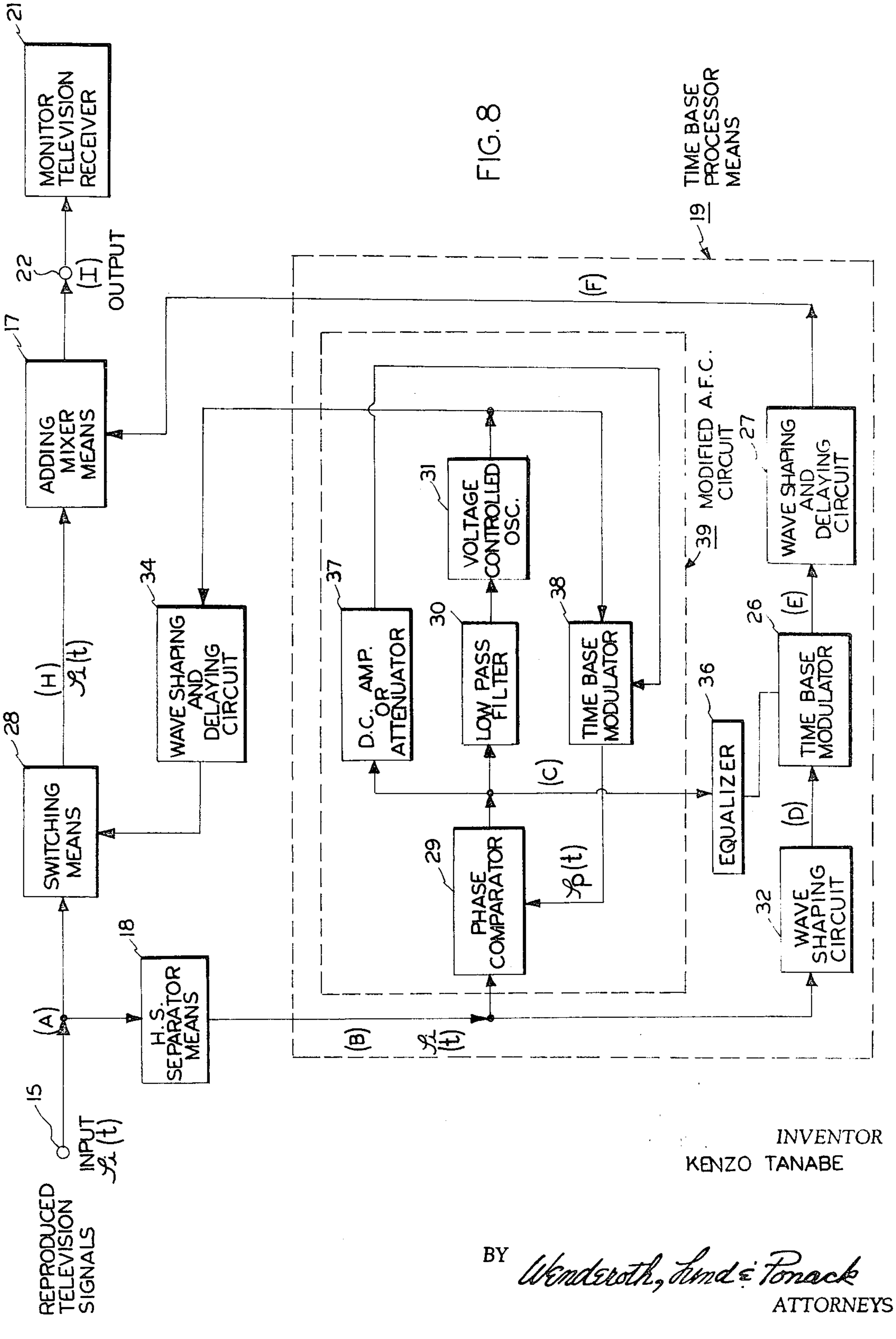

FIG. 8 illustrates an example of the system according to the present invention utilizing a modified A.F.C. circuit for detecting the timing error signal.

Referring to FIGS. 8 and 9, the system shown is similar to that of FIG. 6 except that the A.F.C. 39 circuit is modified to provide a time base modulator 38 in the closed loop between the voltage controlled oscillator 31 and the phase comparator, and the output of the phase comparator 29 is also connected to a D.C. amplifier or attenuator 37 which in turn is connected to the time base modulator 38.

Television signals, which have a timing error of $\zeta_i(t)$ reproduced from a V.T.R. are assumed to have a wave form as shown in FIG. 9A. Said television signals are supplied to the input terminal 15 and are supplied to both the signal switching means 28 and the horizontal synchronizing signal separator means 18.

The signal switching means 28 receives other signals, that is, pulses having a waveform as shown in FIG. 9G, and switches the television signals having the waveform shown in FIG. 9A to a fixed level during horizontal blanking and produces modified picture signals having a waveform as shown in FIG. 9H in which the horizontal synchronizing signals are removed from the television signals having the waveform of FIG. 9A.

The signal switching means 28 can in practice be a switching circuit which holds the input signal to a fixed level during the application of the pulses having a waveform as shown in FIG. 9G.

The horizontal synchronizing signal separator means 18, which can be a well known non-linear amplifier, separates the horizontal synchronizing signals from the input television signals and the resultant pulses having a waveform as shown in FIG. 9B are supplied to time base processor means 19.

The time base processor means 19 develops processed horizontal synchronizing signals having a waveform as shown in FIG. 9F during horizontal blanking. The processed horizontal synchronizing signals have timing errors of $\zeta_r(t)$ instead of $\zeta_i(t)$.

The newly developed horizontal synchronizing signals having a waveform as shown in FIG. 9F and the modified picture signals having a waveform as shown in FIG. 9H are added by the signal adding mixer means 17 and the resultant signals having a waveform as shown in FIG. 9I are supplied to a monitor television receiver 21 from the output terminal 22.

As a result, the processed television signals having a waveform as shown in FIG. 9I consist of picture signals having timing errors of $\zeta_i(t)$ and horizontal synchronizing signals having timing errors of $\zeta_r(t)$.

A detailed description of the function of the time base processor means 19 is as follows. The separated horizontal synchronizing signals having a waveform as shown in FIG. 9B are supplied to both said wave shaping circuit 32 and said modified A.F.C. circuit 39.

The wave shaping circuit 32 can be, for example, a monostable multivibrator triggered by input signals, and produces signals having a waveform as shown in FIG. 9D. The wave shaping circuit 32 is used as a buffer between said horizontal synchronizing signal separator means 18 and said time base modulator 26, and can sometimes be omitted.

The time base modulator 38 added to the modified A.F.C. circuit can be the same as time base modulator 26.

The two elements added to the modified A.F.C. circuit have an effect on the timing error transfer characteristics of said modified A.F.C. circuit 39 as described later. Said modified A.F.C. circuit 39 develops two signals, one of which is obtained from said voltage controlled oscillator 31 and the other of which is obtained from said phase comparator 29. The timing error signal having a waveform as shown in FIG. 9C, obtained from said phase comparator 29, is supplied to said time base modulator 26 through said equalizer 36 and modulates the timing of the signals obtained from said wave shaping circuit 32.

The time base modulated signals having a waveform as shown in FIG. 9E are supplied to said wave shaping and delaying circuit 27 which develops processed horizontal synchronizing signals having a waveform as shown in FIG. 9F.

The time base modulator 26 and wave shaping and delaying circuit 37 operate and are constituted the same as described above in conjunction with FIG. 4.

The processed horizontal synchronizing signals have timing errors of $\zeta_r(t)$ and are supplied to the signal adding mixer means 17 as already described above.

The signals obtained from said voltage controlled oscillator 31 are supplied to a wave shaping and delaying circuit 34 which produces signals having a waveform as shown in FIG. 9G to drive said signal switching means 28.

If the system in FIG. 8 has sufficient linearity where the timing errors exist, the timing errors of the signal obtained from said time base modulator 38 defined as $\zeta_p(t)$ can be expressed by Equation (10):

$$\zeta_p(s)=k_7(\zeta_i(s)-\zeta_p(s))(e(s)+k_8\cdot k_9) \qquad (10)$$

where $k_7$ : sensitivity of said phase comparator 29.

$k_8$ : gain or loss of D.C. amplifier or attenuator 37.

$k_9$ : sensitivity of said time base modulator 38.

$E(s)$ : timing error transfer function of the combination of said low pass filter 30 and voltage controlled oscillator 31.

$\zeta_i(s),\zeta_p(s)$ : Laplace Transformation of timing errors of $\zeta_i(t),\zeta_p(t)$, respectively.

From Equation (10) the timing error signal of $k_7(\zeta_i(t)-\zeta_p(t))$ obtained from said phase comparator 29 can be expressed by Equation (11):

$$k_7(\zeta_i(s)-\zeta_p(s))=\frac{k_7\cdot\zeta_i(s)}{1+k_7(E(s)+k_8\cdot k_9)}. \qquad (11)$$

Therefore, the timing errors of said newly developed horizontal synchronizing signals can be expressed by Equation (12) by using Equation (11):

$$\zeta_r(s)=\left(1+\frac{k_7\cdot D(s)}{1+k_7(E(s)+k_8\cdot k_9)}\right)\zeta_i(s) \qquad (12)$$

where $D(s)$ : transfer function of said equalizer 36.

$\zeta_r(s)$ : Laplace Transformation of timing errors of $\zeta_r(t)$.

As already mentioned above, said time base processor means 19 must satisfy the Equation (3), and therefore the relation among $K_7$, $K_8$, $K_9$, $E(s)$, and $D(s)$ in Equation (12) can be defined by Equation (13):

$$\left(1+\frac{k_7\cdot D(s)}{1+k_7(E(s)+k_8\cdot k_9)}\right)=\frac{1+F(s)}{F(s)} \qquad (13)$$

Providing the system is designed to satisfy the conditions expressed in Equations (14) and (15), Equation (13) can be rewritten as Equation (16).

$$K_7\cdot k_8\cdot k_9=-1 \qquad (14)$$

$$k_7\cdot D(s)=1 \qquad (15)$$

$$\frac{1+k_7\cdot E(s)}{k_7\cdot E(s)}=\frac{1+F(s)}{F(s)} \qquad (16)$$

Since $k_7\cdot E(s)$ in Equation (16) is considered to be the open loop timing error transfer function of the basic loop of said modified A.F.C. circuit 39, it can be concluded from Equation (16) that it is important to select the open loop timing error transfer function of the basic loop of said modified A.F.C. circuit 39 to be equal to the open loop timing error transfer function of the A.F.C. circuit in a monitor television receiver, and that it is also important to design the system to satisfy the conditions expressed in Equations (14) and (15) in order for the system of FIG. 8 to work satisfactorily.

The Equation (15) also shows that said equalizer 36 can in practice be a fixed attenuator or D.C. amplifier practically.

The embodiment of the present invention shown in FIG. 8 requires somewhat complicated design considerations. However, it compensates for the timing error transfer function of the A.F.C. circuit in a monitor television receiver satisfactorily even if said transfer function therein is less than unity.

While the above detailed descriptions have shown, described and pointed out the fundamental novel features of the invention as applied to preferred embodiments, it will be understood that various omissions and substitutions and changes in the system illustrated above may be made by those skilled in the art, without departing from the spirit of the invention.

What is claimed is:

1. A system for minimizing picture quality reducing fluctuations in television signals for reproduction on the screen of a monitor television receiver which fluctuations are caused by timing errors contained in the television signals including vertical and horizontal synchronizing signals, said system comprising switching means for removing only the horizontal synchronizing signals from said television signals so as to produce modified picture signals; separator means for selectively separating the horizontal synchronizing signals from said television signals; mixer means connected to said switching means; and time base processor means coupled between said separator means and said mixer means and which include timing error detector means and time base modulator means as fundamental elements, for processing the timing of said separated horizontal synchronizing signals by a timing error signal detected from said separated horizontal synchronizing signals so as to compensate for the timing error transfer function of the automatic frequency control circuit in said monitor television receiver, and said processed horizontal synchronizing signals being additively mixed with said modified picture signals by said mixer means so as to produce processed television signals which can be applied to said monitor television receiver.

2. A system as claimed in claim 1 in which said time base processor means further comprises timing error eliminator means also coupled to said separator means for eliminating said timing error from said separated horizontal synchronizing signals so as to produce horizontal synchronizing signals having a uniform period; equalizer means coupled between timing error detector means and said time base modulator means for equalizing said detected timing error signal in a weighted relationship; and wave shaping and delaying means coupled to said time base modulator means for shaping the waveform of said modulated horizontal synchronizing signals in a conventional form and for delaying said modulated horizontal synchronizing signals so that their position accords with the horizontal blanking portion of said modified picture signals which are produced by said switching means, whereby the resulting processed horizontal synchronizing signals can be supplied to said mixer means; the weighted relationship according to which said equalizer means equalizes the detected timing error signal being such that when taken in conjunction with the operation of said timing error detector means and said time base modulator means said system compensates said timing error transfer function of the automatic frequency control circuit in said monitor television receiver.

3. A system as claimed in claim 1 in which said time timing error detecting means comprises an automatic frequency control circuit means for detecting said timing error signal from said separated horizontal synchronizing signals and having the same timing error transfer function as the automatic frequency control circuit in said monitor television receiver; and said time base processor further comprises equalizer means coupled between said automatic frequency control circuit and said time base modulator means for equalizing said detected timing error signal in a weighted relationship; and wave shaping and delaying means coupled to said time base modulator means for shaping the waveform of said modulated horizontal synchronizing signals in a conventional form and for delaying said modulated horizontal synchronizing signals so that their position accords with the horizontal blanking portion of said modified picture signals which are produced by said switching means, whereby the resulting processed horizontal synchronizing signals can be supplied to said mixer means; the weighted relationship according to which said equalizer means equalizes the detected timing error signal being such that when taken in conjunction with the operation of said automatic frequency control circuit means and said modulator means said system compensates said timing error transfer function of the automatic frequency control circuit in said monitor television receiver.

4. A system as claimed in claim 1 in which said timing error detecting means comprises automatic frequency control circuit means for detecting said timing error signal from said separated horizontal synchronizing signals and for producing stabilized horizontal synchronizing signals from said separated horizontal synchronizing signals and said circuit means having the same timing error transfer function as that of the automatic frequency control circuit in said monitor television receiver; and said time base processor further comprises equalizer means coupled between said automatic frequency control circuit and said time base modulator means for equalizing said detected timing error signal in a weighted relationship; and wave shaping and delaying means coupled to said time base modulator means for shaping the waveform of said modulated horizontal synchronizing signals in a conventional form and for delaying said modulated horizontal synchronizing signals so that their position accords with the horizontal blanking portion of said modified picture signals which are produced by said switching means, whereby the resulting processed horizontal synchronizing signals can be supplied to said mixer means; the weighted relationship according to which said equalizer means equalizes the detected timing error signal being such that when taken in conjunction with the operation of said automatic frequency control circuit means and said modulator means said system compensates said timing error transfer function of the automatic frequency control circuit in said monitor television receiver.

5. A system as claimed in claim 4 in which said automatic frequency control circuit means has two loops, one of which has the same open loop timing error transfer function as that of the automatic frequency control circuit in said monitor television receiver, and the other of which has an open loop timing error transfer function of unity.

* * * * *